ROUTING OF CALLS CONSECUTIVELY TO THREE TRUNKS OF A GROUP

Filed Nov. 20, 1952 2 Sheets-Sheet 1

INVENTOR
WILLIAM W. PHARIS
BY
T. L. Bowes
ATTORNEY

May 31, 1955 W. W. PHARIS 2,709,718

ROUTING OF CALLS CONSECUTIVELY TO THREE TRUNKS OF A GROUP

Filed Nov. 20, 1952 2 Sheets-Sheet 2

INVENTOR
WILLIAM W. PHARIS
BY
T. L. Bowes
ATTORNEY

United States Patent Office 2,709,718

Patented May 31, 1955

2,709,718

ROUTING OF CALLS CONSECUTIVELY TO THREE TRUNKS OF A GROUP

William W. Pharis, Rochester, N. Y., assignor to Stromberg-Carlson Company, a corporation of New York Application November 20, 1952, Serial No. 321,549

5 Claims. (Cl. 179—18)

Figure 1:
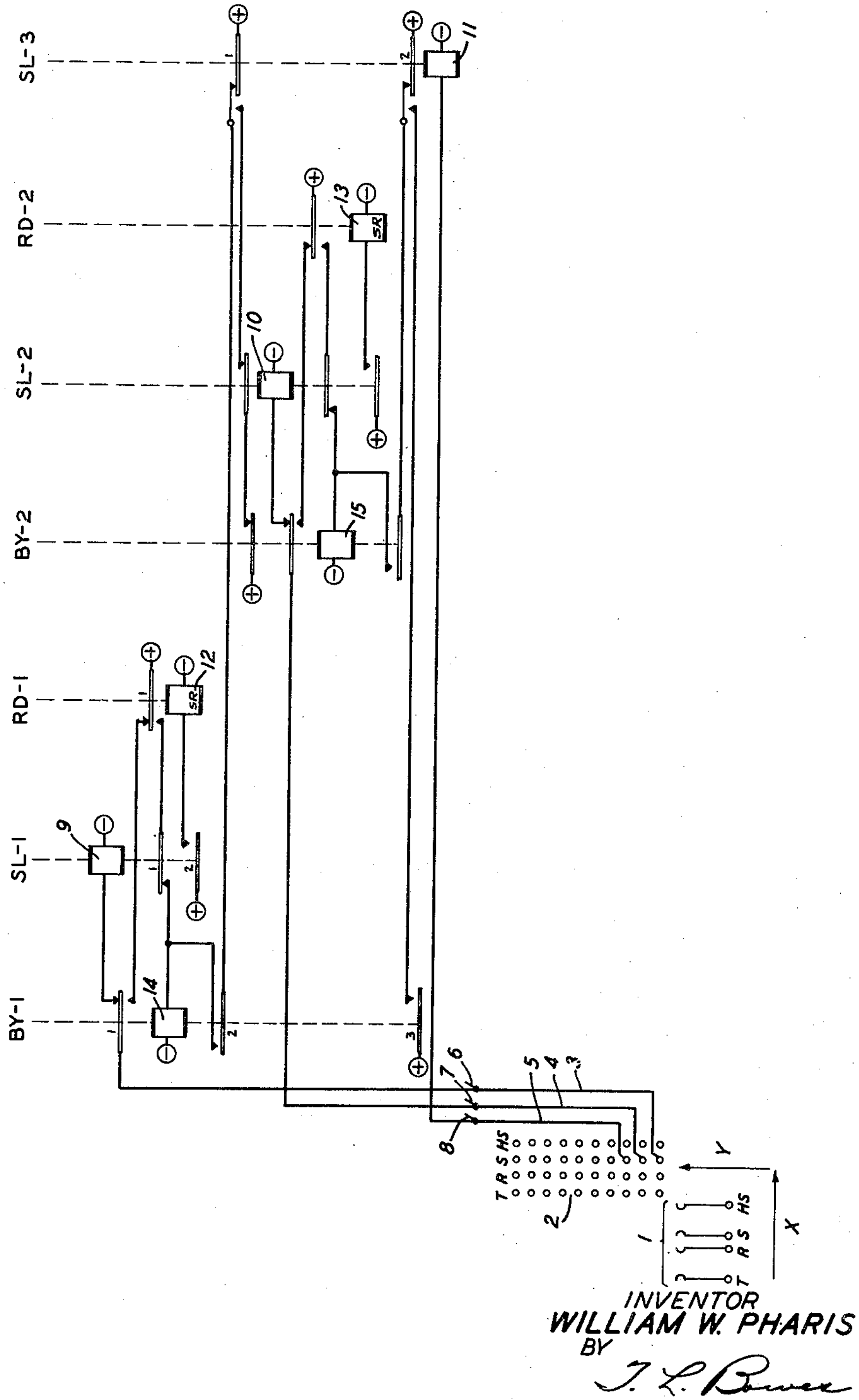

This invention relates to selecting systems and particularly to means in a telecommunication system for insuring the consecuvtive use of trunking facilities.

The object of the invention is to promote simplicity and economy of apparatus and reliability of the operation thereof. Heretofore many arrangements have been devised for equalizing the use of the separate ones of a plurality of facilities such as trunks. Generally, such schemes have interfered with the orderly arrangement of the facilities or have entailed elaborate and sometimes costly circuits and apparatus, such as the elaborate allotter circuits.

The present invention provides a simple relay circuit which may be added to an existing installation without disturbing the circuits or entailing any alternation or rearrangement thereof and which will insure the consecutive use of a plurality of facilities.

In a preferred embodiment of the invention an arrangement is disclosed for insuring the consecutive use of three trunks in a telecommunication system, though it will be understood that the invention is not to be limited to the selection of circuit arrangements nor is it to be limited to use in a telecommunication system, but is of general application and only requires that the various facilities to be used each be provided with a terminal through which the facility may be seized and that some means be provided to invariably search over these terminals in a given order when the demand for a facility arises.

The invention resides in what is commonly termed an applique circuit which is added to existing arrangements without in any way rearranging the wires or other elements thereof. A single conductor is connected to each sleeve conductor of the consecutively arranged trunks and leads to a sleeve relay which operates whenever the trunk is seized. The seizure and use of the trunk applies a barring potential to this sleeve conductor in the conventional manner and this added sleeve relay causes certain circuit changes to take place so that if upon the release of the trunk it is not due for seizure in the required consecutive order a substitute barring potential will be applied to the said sleeve conductor.

A feature of the invention is a relay associated with each trunk excepting the last which will be momentarily operated upon the release of the trunk. In association with these relays there is a network responsive to the busy or non-busy condition of the other trunks which offers a locking circuit to the said momentarily operated relay if the associated trunk is one of two or more now available for seizure but is not the next in consecutive order due for seizure. This momentarily operated relay when operated places a barring potential on the sleeve of its associated trunk.

A feature of the invention is a plurality of trunks arranged in consecutive order, means for invariably searching over the said trunks in order for the first available one thereof and a circuit network responsive to the seizure of said trunks in consecutive order for placing barring potential on each of said trunks up to the next in consecutive order available one thereof. It is to be noted that more than one of these trunks may be marked as idle or available but the first in searching order thereof is invariably the next in consecutive order due for seizure. Thus, by way of example, all the trunks may be concurrently idle and available and if the first in searching order is the first in consecutive order due for seizure, then all the said trunks will be devoid of a barring potential on the testing terminals thereof, but if the last in searching order is the first in consecutive order due for seizure, then all the other said trunks will have a barring potential on their testing terminals. A feature of the invention may therefore be stated as means for automatically marking all trunks in searching order up to the first available trunk in consecutive order as unavailable for seizure.

Figure 2:
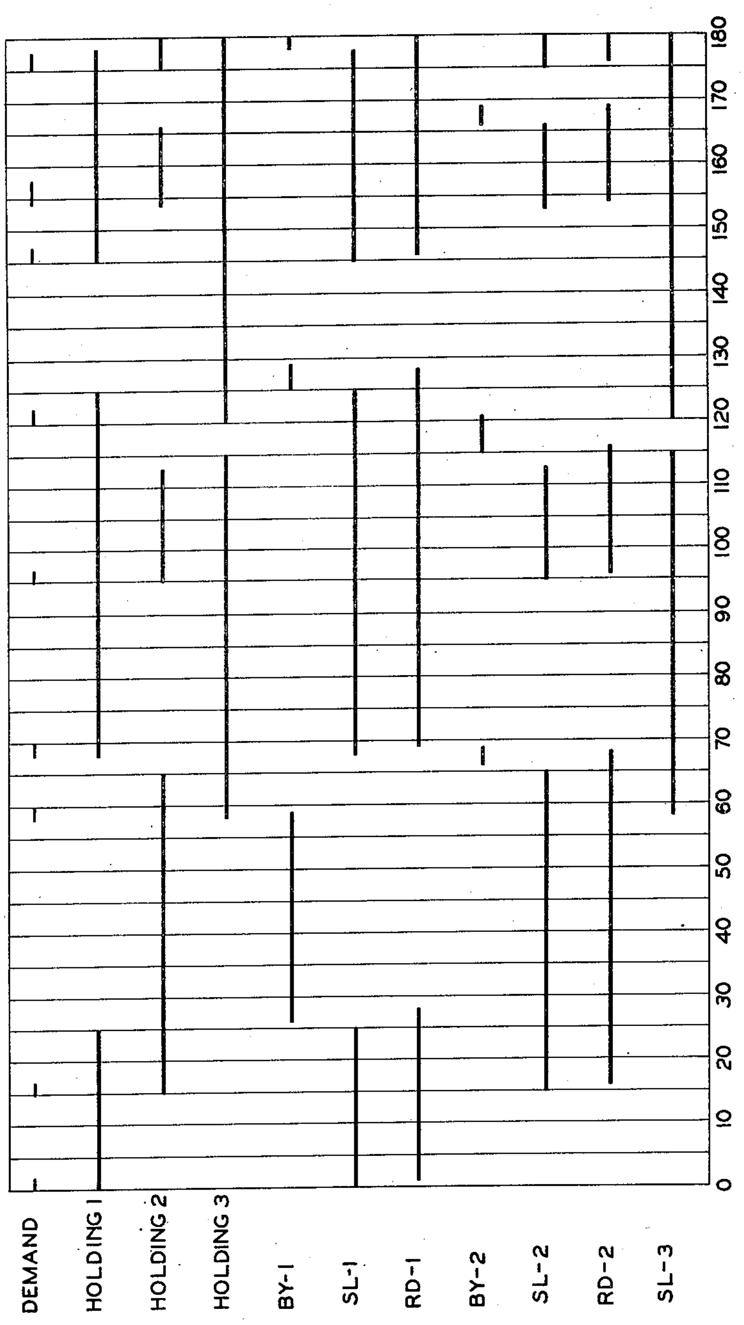

The drawings consist of two sheets having two figures as follows:

Fig. 1 is a schematic circuit diagram showing how the invention may be applied to a group of three trunks in a telecommunication system; and Fig. 2 is a time chart giving an example of the operation of the relays of said circuit over a given period of time and through a given pattern of demand for the said trunks.

In Fig. 1 there is a set of four brushes marked T, R, S and HS designated 1. These represent the brushes of a step-by-step switch as for example a two-motion switch sold under the trade-mark "XY" which is movable step by step in a primary or X direction to select a given level and thereafter in a secondary or Y direction to select a given set of terminals in the selected level. The terminals 2 are represented by a group of small circles, actually the cross section of a bare wire terminal bank. The sleeve brush, as well as the other brushes of the set 1, hunt over the terminals of this bank in a fixed order and therefore the circuits 3, 4 and 5 are searched invariably in this order. The multiple taps 6, 7 and 8 indicate that these wires 3, 4 and 5 are also connected to like selecting means in the same order.

Each of the wires 3, 4 and 5 is connected normally to a sleeve relay, such as the relays 9, 10 and 11 respectively, and each sleeve relay excepting the last in this fixed order controls an associated slow releasing relay, such as the relays 12 and 13, respectively. By way of example, when the first in the fixed order of these circuits has been seized and the wire 3 has been grounded, then the sleeve relay 9 will be operated and through its armature 2 and front contact will cause the operation of its associated slow releasing relay 12. When this circuit is released the sleeve relay 9 releases but the slow releasing relay 12, due to its slow releasing characteristics, remains operated for a moment. During this time a circuit is established from ground, armature 1 and front contact of the relay 12, armature 1 and back contact of the relay 9 to the winding of a busy marking relay 14. This busy marking relay will operate during the releasing time of the slow releasing relay 12. If the last in order of these circuits has not been used, then the busy marking relay 14 will lock through the normal contacts and armature 1 of the sleeve relay 11 to ground and after the slow releasing relay 12 has restored to normal will place a ground on the wire 3 so that this circuit will appear busy to any one of the switches searching over the terminals of these circuits in the said fixed order.

Therefore, it will appear that if the first circuit has been taken for use and then released before another demand for one of these circuits arises that the switches searching over the terminals in the said fixed order will be barred from again using the first one thereof and will be forced to use the next one so that in this manner the circuits selectable by the switches must be used in consecutive order.

The same action takes place with relation to the circuit connected to the wire 4, that is the sleeve relay 10 is operated when this circuit is taken for use and the slow releasing relay 13 is energized thereby. Upon the release of this circuit as the sleeve relay 10 restores a circuit is established for the busy marking relay 15 and this locks through the normal contacts and armature 2 of the sleeve relay 11. Thereafter another demand for the use of one of these circuits will find a busy condition on both wires 3 and 4 and therefore the third in order of these circuits will be selected. Thereupon the relay 11 will be operated and both the busy marking relays 14 and 15 will be released.

*Time study*

Fig. 2 is a time chart designed to illustrate the operation of this applique circuit over a plurality of demands for the use of three circuits. The chart is divided into a plurality of time intervals in the primary or X direction and the heavy line markings in the various levels indicate the operation of various relays and the time intervals over which certain conditions exist. The demand for the circuits has been illustrated by very short intervals though in practice the actual demand lasts over the holding time of the circuit. The holding times of the circuits are shown in the next three levels and it will be noted that these holding times overlap in various orders. Below the holding times there are operating times for the various relays. It may also be noted that the timing chart is somewhat distorted in that the actual operating times of the various relays are extremely short in relation to such periods as the holding times of the various circuits. For instance, the first demand arises during the zero period and the SL–1 relay is shown as immediately operating. The RD–1 relay, however, is shown as operating at the beginning of the number 1 interval, this being an indication that the RD–1 relay does not operate until the SL–1 relay has operated. By the same token, the SL–1 relay is shown as releasing at the beginning of interval 25 when the holding time of the number 1 circuit has terminated. The RD–1 relay, however, is shown as extending in its operation to the beginning of interval 28, this prolonged period representing the slow releasing characteristic of the RD–1 relay. During this interval between the beginning of interval 25 and the beginning of interval 28, the BY–1 relay has an opportunity to operate and the operation thereof takes place at the beginning of interval 26. It will be readily recognized that these intervals in the operation of these relays is purely by way of example and does not represent the true proportion of time, particularly where these intervals are used also in the representation of the holding time of the various circuits.

After the first demand extending over the zero and first periods has arisen, the SL–1 relay and thereafter the RD–1 relay operate. At the beginning of interval 15 another demand arises whereupon the SL–2 and an interval later the RD–2 relays operate. At interval 25 the holding time of the first circuit terminates, whereupon the BY–1 relay operates during the releasing time of the RD–1 relay and, since the SL–3 relay has not as yet been operated, the BY–1 relay will lock into its holding circuit and remain operated to place a busy marking condition on the number 1 circuit. Therefore, when the third demand arises at the beginning of interval 58 the first circuit is found to be busy (artificially) and the second circuit is found to be busy (genuinely) so that the third circuit must be seized in this consecutive order.

Let us say that the holding time of the second circuit extends to interval 65 and thereupon terminates so that during intervals 66, 67, and 68 the BY–2 relay operates during the release time of the RD–2 relay. However, another demand comes in at interval 68 but since the SL–3 relay had operated at interval 58, the BY–1 relay had been released at that time and the artificial busy condition has been removed from the number 1 circuit. Therefore the fourth demand will result in the seizure of the number 1 circuit.

This means that in the intervals following interval 68 both the number 1 and number 3 circuits are marked as busy. Now at interval 95 another demand comes in so that the second circuit is seized and the SL–2 and thereafter the RD–2 relays operate. During the following periods up to period 113, all three circuits are busy but at this time the number 2 circuit is released. Shortly thereafter at interval 115 the third circuit is also released. Therefore, the BY–2 relay remains locked in a circuit from ground, armature 3 and front contact of the BY–1 relay and alternate contacts of the armature 2 of the SL–3 relay operates. Hence, when the sixth demand comes in at interval 120, the number 2 circuit will be marked artificially busy so that the selection will be forwarded to the number 3 circuit.

The only deviation from the strict consecutive selection of these circuits occurs in a circumstance such as that illustrated by the ninth demand coming in at interval 175, where the first circuit has been used and is still in use, the second circuit has been used in order but has been released and the third circuit is still in use from a prior demand. In this case, since the second circuit is the only one available, it will be rendered selectable even though its turn in consecutive order has passed. In this case with the number 1 and number 3 circuits actually in operation, the sleeve relay 9 and the sleeve relay 11 will be operated and therefore as the sleeve relay 2 is released and the busy marking relay 15 is momentarily operated there will be no locking circuit available therefor.

Thus it will be seen that the applique circuit designed to be connected to an existing circuit without interference therewith will insure that the various trunks invariably searched in a fixed order will be used in consecutive order.

What is claimed is:

1. In a selecting system, an applique circuit for addition to the sleeve terminals of a plurality of circuits for insuring the seizure of said circuits in consecutive order, said circuits being accessible to switching means in a fixed order, said applique circuit having a sleeve relay for each said circuit and a busy marking relay for each said circuit excepting the last in said fixed order for barring seizure of said circuit, and means responsive to the advance in consecutive order beyond a said circuit in its said fixed order for operating said barring relay.

2. In a selecting system, an applique circuit for addition to the sleeve terminals of a plurality of circuits selectable in fixed order, consisting of a sleeve relay for each said circuit, a slow release and a busy marking relay for each of said circuits excepting the last one thereof in said fixed order, means responsive to the actual busy condition of any one of said circuits for marking its said sleeve terminal with a barring potential, means responsive to the release from a busy condition of any one of said circuits excepting the last one thereof for momentarily operating said busy marking relay, and a locking circuit therefor responsive to the advance in consecutive order of use of said circuits beyond a said released circuit in said fixed order.

3. In a selecting system, selecting means, an applique circuit for addition to the sleeve circuits of a plurality of circuits connected in fixed order to said selecting means, said applique circuit having a sleeve relay for each said sleeve circuit, a slow releasing relay associated with and responsive to the operation of each said sleeve relay excepting said sleeve relay for the last in said fixed order of said plurality of circuits, a busy marking relay for each of said sleeve circuits excepting the last in said fixed order, means controlled by the said associated slow releasing relay for operating said busy marking relay, a locking circuit for said busy marking relay and means responsive to the advance in consecutive use of said circuits in relation to said fixed order for controlling said locking circuits.

4. In a selecting system, selecting means, an applique circuit for addition to the sleeve circuits of a plurality of circuits connected in fixed order to said selecting means, said applique circuit having a sleeve relay for each said sleeve circuit, a slow releasing relay associated with and responsive to the operation of each said sleeve relay excepting said sleeve relay for the last in said fixed order of said plurality of circuits, a busy marking relay for each of said sleeve circuits excepting the last in said fixed order, means controlled by the said associated slow releasing relay for operating said busy marking relay upon the release of said associated sleeve relay and means responsive to the released condition of another of said sleeve relays beyond said momentarily operated busy marking relay in said fixed order for locking said busy marking relay.

5. A switching means for insuring the consecutive use of a plurality of electrical circuits, each said circuit having a terminal for testing for the availability for use of said circuit, means responsive to demand for a said circuit for scanning said terminals in a fixed order and for seizing the first available circuit encountered in said scanning operation, means responsive to seizure of said circuit for marking said associated terminal to bar seizure thereof and means responsive to the termination of use of another said circuit prior in consecutive order for marking its said terminal to bar seizure thereof.

References Cited in the file of this patent

UNITED STATES PATENTS 2,294,907 Hovland ---------------- Sept. 8, 1942

OTHER REFERENCES

Telephone Theory and Practice, Miller; McGraw-Hill, 1933, pages 43–47, TK 6161 M 66.